United States Patent [19]

Schmidt et al.

[11] Patent Number: 5,100,641

[45] Date of Patent: Mar. 31, 1992

[54] METHOD FOR THE PRODUCTION OF FILLERS AND FLAME RETARDANTS BASED ON GIBBSITE AND APPLICATION IN PLASTICS

[75] Inventors: Hubertus Schmidt, Eitorf; Albrecht Husmann, Bornheim, both of Fed. Rep. of Germany

[73] Assignee: Vereinigte Aluminium-Werke Aktiengesellschaft, Bonn, Fed. Rep. of Germany

[21] Appl. No.: 310,259

[22] Filed: Feb. 13, 1989

[30] Foreign Application Priority Data

Feb. 11, 1988 [EP] European Pat. Off. ........... 88102017

[51] Int. Cl.$^5$ .............................................. C01F 7/02
[52] U.S. Cl. .................................. 423/624; 423/625; 423/626; 423/629
[58] Field of Search ............... 423/625, 624, 626, 629

[56] References Cited

U.S. PATENT DOCUMENTS

| | | | |
|---|---|---|---|
| 3,874,889 | 4/1975 | Geppert | 423/625 |
| 4,612,184 | 9/1986 | Seigneurin | 423/629 |
| 4,900,537 | 2/1990 | Wilhelmy | 423/629 |

*Primary Examiner*—Peter D. Rosenberg
*Attorney, Agent, or Firm*—Darby & Darby

[57] ABSTRACT

A process is disclosed for producing aluminum hydroxide in the form of gibbsite in particular shapes, suitable for use as a filler, flame retardant and/or fibrous reinforcement. The process includes the steps of crystallizing gibbsite from a Bayer process sodium aluminate liquor, in the presence of an additive comprising either a hydroxycarboxilic acid for producing needle shaped, rod-like hydrargillite or in the presence of a polyalcohol, fatty acid or lithium compound for producing platy or tabular gibbsite.

20 Claims, 1 Drawing Sheet

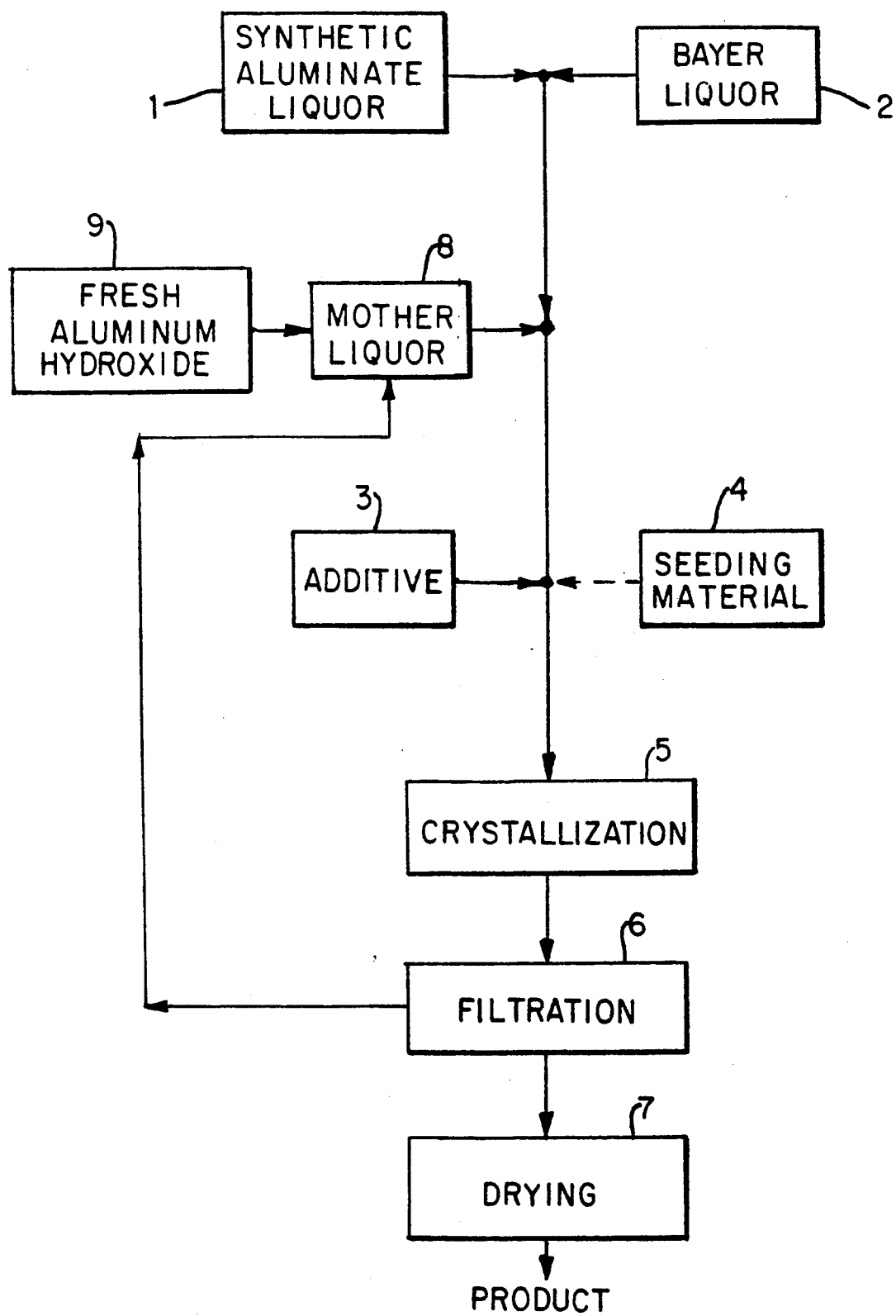

METHOD FOR THE PRODUCTION OF FILLERS AND FLAME RETARDANTS BASED ON GIBBSITE AND APPLICATION IN PLASTICS

The invention is directed to a method for the production of fillers and flame retardants based on aluminum hydroxide in the form of gibsite. The fillers of the invention are especially suited for use in plastics. The invention is also directed to a morphologically modified aluminum hydroxide, produced pursuant to the method of the invention.

Aluminum hydroxide, generally produced by the Bayer method, is used as a raw material for producing aluminum oxides and aluminum salts suitable for use as a filler and flame retardant.

Aluminum hydroxide, obtained from the conventional Bayer process, is usually in the form of either a finely divided or coarse-grained material of irregularly (approximately round) shaped aggregates/ agglomerates. The material is typically prepared under the following conditions (according to O. Tschamper, Light Metals 1981, pp. 103–115):

|  | $Na_2O_{free}$ [g/L] | $Al(OH)_3$ Seed Charge [g/L] | Initial Temperature [°C.] | Duration of Stirring [h] |
|---|---|---|---|---|
| USA | ≦110 | 50–120 | ca. 70 | ca. 30 |
| Europe | 150 | >220/250–400 | ca. 55 | ca. 50–70 |

The important process conditions of the process are fixed by the following parameter (according to J.L. Anjier and M.L. Roberson, Precipitation Technology, Light Metals 1985, 367–375):

|  | Initial Molar Ratio $Na_2O_{free}/Al_2O_3$ | $Al(OH)_3$ Seed Charge [g/L] | Temperature [°C.] |
|---|---|---|---|
| (a) Agglomeration Step | 1.37–1.80 | 15–150 | 85–45 |
| (b) Growth Step | 1.37–2.41 | 130–200 | 85–40 |

The main objective is to produce a coarse-grained, dust-free electrolysis grade aluminum oxide, with particles ranging in size from about 45 to 250 microns.

Aluminum hydroxide products are crystallized in the Bayer process, using large amounts of a coarse-grained aluminum hydroxide as a seed material. They may also be produced from a Bayer caustic aluminate liquor by using a finely divided aluminum hydroxide as a seed material (obtained through neutralization or milling processes). These products may be optionally modified in subsequent preparation steps such as by etching, milling, screening or classifying (according to particle size and shape), for various uses such as fillers and flame retardants in plastics.

U.S. Pat. No. 2,549,549, German Patents 897,843, 952,978 and 2,952,273, German Offenlegungsschriften 3,338,169, 3,338,186, European Patent 0,102,403 and European Auslegeschrift 0,166,053 provide some insight into the state of the art of manufacturing such aluminum hydroxides. German Patent 2,852,273, for example, describes the manufacture of an aluminum hydroxide, which can be used as a filler and flame retardant in plastics. The '273 German patent also describes the advantages of such a product which are based upon the special rounded shape of the grain that is produced by a particular etching method.

The chemical constitution (for example, the proportion of water of crystallization) and the thermal behavior (such as the decomposition temperature) are the decisive criteria if a filler is to function as an effective flame retardant material. If, moreover, the filler should also function as a reinforcing agent, additional product properties must be taken into consideration. These include, for example, the particle geometry (form factor, also known as shape factor, shape ratio, aspect ratio), see for example, the "Handbook of Fillers and Reinforcements for Plastics", van Nostrand Reinhold Company, 1978, H.S. Katz, J.V. Milewski editor, and in Kunststoffe 73, 511–515, 1983, where these properties are discussed in detail. ("Form Factor" is equivalent to shape factor or ratio and aspect ratio, and refers to the ratio of length or diameter of a crystal to thickness).

A comparison of the properties of the aforementioned products, obtainable via the Bayer process or variants thereof, or produced using special modified procedures, shows that the known products do not possess any of the characteristics which are typical of reinforcing agents or that they have such properties only to a limited degree. Definite reinforcing effects are expected from crystallizates, the particles of which comprise platelets or needle like fibers with high shape factors. In isolated cases, such products are also known to be formed from hydrargillite. Hydrargillite is also known as gibbsite and has the formula $Al(OH)_3$. However, there are no indications as to how the morphologic type of the sought after end product can be changed within the limits of a large-scale industrial process to the desired extent.

Descriptions of these special crystalline forms of gibbsite (for example, finely divided particles, platelet-shaped crystallizates with particle sizes of about 1 micron or lower, prismatic needle-like or rod-shaped crystallizates from pure potassium aluminate liquors) may be found, for example, in "Industrial Alumina Chemicals", Ch. Misra author, ACS Monograph 184, 1986, pages 10–11, 46–47.

The German Offenlegungsschrift 3,313,088 discloses a method for the production of coarse aluminum hydroxide according to the Bayer method. By means of this method, hydrargillite is produced exclusively in the form of almost spherical agglomerates.

Pursuant to European Auslegeschrift 02 71 104 also, spherical aluminum hydroxide particles are produced, which may, however, consist of single platelet- or needle-shaped crystals. Monohydric to trihydric alcohols can be used in amounts of 1 to 50% by volume to control the crystalline shape of the end product, provided that the alcohol constituents do not adversely affect the product yield.

It is an object of the present invention to provide a method for controlling the morphology of fillers and flame retardants based on aluminum hydroxide in the form of hydrargillite, during the production of such materials, which can be carried out on an industrial scale, is economical, does not contaminate the environment (because the additives are recycled) and which leads to a great range of variations of differently developed, needle-shaped, rod, fibrous, platelet-like or tabular gibbsite crystals with high shape factors, which have reinforcing properties.

This objective is accomplished with the method of the present invention. With suitable additives, the method enables the morphology of aluminum hydroxide gibbsite crystals to be controlled within a single process operation. The results of this method are surprising, because the Bayer aluminate liquors usually are contaminated with a large amount, and a large number, of different inorganic and organic impurities and because, from the previously known crystallization processes with sodium aluminate liquors, the use of the "additive method" with impure liquors appeared to be problematical.

By means of the inventive method, novel aluminum hydroxide crystals can be produced having shapes which comprise extremely thin platelets, laminar and tabular crystals or short prismatic needle- or rod-like or fibrous products.

The effects controlling the physical appearance of the aluminum hydroxide crystals of the present invention are particularly striking for crystallization processes above 70° C., outside of the standard temperatures of the Bayer method for crystallization processes from sodium aluminate liquors with molar ratios of $Na_2O : Al_2O_3 < 1,3$, outside of the standard molar ratios of the Bayer process when using large amounts of additives when using small amounts of seeding materials.

DESCRIPTION OF THE DRAWINGS

FIG. 1 is a schematic view of one embodiment of the process of the invention.

The inventive method can be carried out with a Bayer aluminate liquor as well as with a synthetic Bayer liquor prepared from aluminum hydroxide and sodium hydroxide or from a solid sodium aluminate; a preferred composition of the Bayer liquors and synthetic liquors is given in the examples of Table 1.

TABLE 1
(CRYSTALLIZED AFTER 48 HOURS)

| Experimental Example No. | Sodium Aluminate Liquor Molar Ratio $Na_2O/Al_2O_3$ | $Na_2O$ [g/l] | $Al_2O_3$ [g/l] | Additive Type | [g/l] Amount Used | Seed Charge [%] Milled Product | Seed Charge [%] Aged Gel | Temp. [°C.] | Crystal Type | Product Morphology Dimensions of primary crystal Length or Diameter [μm] | Thickness [μm] | Shape Factor |
|---|---|---|---|---|---|---|---|---|---|---|---|---|
| 1 | 1,6 | 138 | 142 | Glycerin | 4,7 | 2 | — | 80 | platelet-shaped, tabular | 2-20 | 0,3-0,8 | 5-20 |
| 2 | 1,6 | 141 | 145 | " | 9,7 | 4 | — | 80 | platelet-shaped, tabular | 1-5 | 0,1-0,3 | 10-30 |
| 3 | 1,4 | 126* | 147 | " | 9,8 | 2 | — | 80 | tabular | 1-7 | 0,1-0,5 | 10-60 |
| 4 | 1,2 | 177 | 243 | " | 4,9 | — | — | 80 | tabular | 10-30 | 0,05-0,3 | 5-30 |
| 5 | 1,2 | 164 | 225 | " | 6,0 | — | — | 90 | lamellar | 10-50 | 0,3-2,4 | 20-30 |
| 6 | 1,2 | 176 | 242 | " | 9,7 | — | — | 80 | tabular | 5-25 | 0,2-0,5 | 25-125 |
| 7 | 1,2 | 164 | 225 | " | 10,0 | — | — | 80 | tabular | 10-30 | 0,3-2,7 | 10-20 |
| 8 | 1,2 | 164 | 225 | " | 13,0 | — | — | 80 | lamellar (talc-like) | 10-30 | 0,05-0,15 | 50-250 |
| 9 | 1,2 | 122 | 167 | " | 9,8 | 2 | — | 80 | platelet-shaped | 1-5 | 0,1-0,15 | 10-30 |
| 10 | 1,2 | 103 | 141 | " | 9,8 | 2 | — | 80 | platelet-shaped-thin, tabular | 1-8 | 0,1-0,15 | 10-80 (140) |
| 11 | 1,2 | 180 | 243 | " | 9,7 | 2 | — | 80 | platelet-shaped | 1-7 | 0,05-0,1 | 10-140 |
| 12 | 1,2 | 105 | 144 | " | 3,6 | 6 | — | 80 | platelet-shaped-tabular | 1-2 | 0,05-0,1 | 5-25 |
| 13 | 1,4 | 205 | 233 | oleic acid | 4,7 | 2 | — | 80 | platelet-shaped-tabular | 2-8 | 0,3-0,5 | 5-25 |
| 14 | 1,2 | 157 | 215 | oleic acid | 2,4 | — | — | 80 | platelet-shaped tabular | 0,5-3,0 | 0,1-0,25 | 5-30 |
| 15 | 1,2 | 164 | 225 | oleic acid | 4,0 | — | — | 80 | platelet-shaped | 2-5 | 0,2-0,4 | 5-20 |
| 16 | 1,2 | 109 | 150 | oleic acid | 4,0 | — | — | 80 | platelet-shaped | 0,5-2 | 0,05-01 | 5-10 |
| 17 | 1,2 | 180 | 243 | oleic acid | 4,9 | — | — | 80 | platelet-shaped | 2-5 | 0,2-0,4 | 5-10 |
| 18 | 1,2 | 108 | 146 | oleic acid | 4,9 | — | — | 80 | platelet-shaped | 2/5-8 | 0,2-0,6 | 5-10 |
| 19 | 1,2 | 157 | 215 | oleic acid | 12,0 | — | — | 80 | platelet-shaped (kaolin-like) | 0,5-2,0 | 0,1-0,2 | 5-10 |
| 20 | 1,6 | 190 | 195 | potassium oleate | 2,4 | 2,5 | — | 80 | platelet-shaped | 2-8 | 0,3-0,5 | 5-25 |
| 21 | 1,3 | 193 | 244 | potassium oleate | 2,4 | — | — | 70 | tabular | 5-40 | 0,5-1,0 | 10-20 |
| 22 | 1,25 | 185 | 244 | potassium oleate | 2,4 | — | — | 90 | kaolin-like | 10-50 | 0,05-1,5 | 40-50 |
| 23 | 1,2 | 157 | 215 | potassium oleate | 2,4 | — | — | 80 | tabular | 5-30 | 0,2-2,5 | 5-70 |

TABLE 1-continued (CRYSTALLIZED AFTER 48 HOURS)

| Experimental Example No. | Sodium Aluminate Liquor | | | Additive | | Seed Charge [%] | | Temp. [°C.] | Product Morphology | | | |
|---|---|---|---|---|---|---|---|---|---|---|---|---|
| | Molar Ratio $Na_2O/Al_2O_3$ | $Na_2O$ [g/l] | $Al_2O_3$ [g/l] | Type | [g/l] Amount Used | Milled Product | Aged Gel | | Crystal Type | Dimensions of primary crystal | | |
| | | | | | | | | | | Length or Diameter [um] | Thickness [um] | Shape Factor |
| 24 | 1,2 | 178 | 244 | potassium oleate | 2,4 | — | — | 90 | tabular | 10–30 | 0,5–1,5 | 20–60 |
| 25 | 1,2 | 180 | 244 | potassium oleate | 2,4 | — | — | 80 | tabular | 5–20 | 0,5–1,5 | 5–20 |
| 26 | 1,2 | 157 | 215 | potassium oleate | 12 | — | — | 80 | tabular | 5–15 | 0,2–3,0 | 5–10 |
| 27 | 1,4 | 205 | 234 | Tween 80 | 2,3 | 2 | — | 80 | platelet-shaped-tabular | 2–10 | 0,1–0,5 | 5–20 |
| 28 | 1,3 | 148 | 188 | " | 2,4 | — | — | 90 | tabular | 7–30 | 0,1–5 | 5–70 |
| 29 | 1,25 | 143 | 188 | " | 2,4 | — | — | 50 | platelet-shaped-tabular | 0,5–2 | 0,05–0,2 | 10–15 |
| 30 | 1,2 | 160 | 225 | " | 1,0 | — | — | 80 | tabular | 5–20 | 0,3–2,5 | 5–15 |
| 31 | 1,2 | 178 | 244 | " | 2,4 | — | — | 80 | tabular | 3–20 | 0,1–2 | 10–30 |
| 32 | 1,2 | 107 | 146 | " | 2,4 | — | — | 80 | tabular | 10–50 | 2–5 | 5–10 |
| 33 | 1,7 | 124* | 120 | $Li_2SO_4$ | 8,9 | 10 | — | 40 | platelet-shaped-kaolin-like | 0,5–1 | 0,05–0,1 | 5–20 |
| 34 | 1,3 | 140* | 177 | LiOH | 9,4 | — | — | 80 | platelet-shaped-kaolin-like | 0,5–5 | 0,05–0,2 | 5–50 |
| 38 | 1,2 | 106 | 146 | tartaric acid | 4,9 | — | — | 80 | prismatic fibrous | 10–30 | 0,5–2 | 5–50 |
| 39 | 1,2 | 106 | 146 | tartaric acid | 4,9 | 2 | — | 90 | long, prismatic, needle-shaped | φ (3–7) | φ 0,5 | 5–10 |
| 40 | 1,2 | 106 | 146 | Na-K-Tartrat | 12,2 | 2 | — | 90 | long, prismatic, needle-shaped | 2–5 | 0,1–0,3 | 5–20 |
| 41 | 1,2 | 106 | 146 | " | 12,2 | 2 | — | 80 | long, prismatic, rod-shaped | (1–)5 | 0,5–0,7 | 5–10 |
| 42 | 1,2 | 152 | 214 | Di-K-Tartrate | 24 | — | — | 80 | needle-like, rod-shaped fibrous | 5–15 | 0,2–3 | 5–10 |
| 43 | 1,2 | 150 | 215 | tartaric acid | 4,8 | — | 0.5 | 80 | long, prismatic rod-shaped | 3–8 | 0,5–1,5 | 5–10 |
| 44 | 1,2 | 134 | 192 | tartaric acid | 4,8 | — | 1,5 | 80 | long, prismatic rod-shaped | 5–12 | 1–2 | 5–10 |
| 45 | 1,2 | 117 | 168 | tartaric acid | 4,8 | — | 1,7 | 80 | long, prismatic rod-shaped | 5–13 | 1,–1,5 | 5–10 |
| 46 | 1,2 | 123 | 168 | tartaric acid | 4,8 | — | 1,7 | 80 | long, prismatic rod-shaped | 5–20 | 1–2 | 5–20 |
| 47 | 1,2 | 101 | 144 | tartaric acid | 4,8 | — | 2 | 80 | long, prismatic rod-shaped | 7–15 | 1–2 | 5–8 |
| 48 | 1,2 | 101 | 144 | tartaric acid | 4,8 | – | 2 | 80 | long, prismatic, pointed | 10–30 | 2–4 | 5–8 |

*crystallizates partly with high lithium aluminate content
*in the case of Bayer liquors: $Na_2O = Na_2O_{free}$ Referring to Table 1, a variation in particular parameters illustrates the production of particularly shaped gibbsite. With Experimental Examples 1–48, the time of crystallization remained constant with variations in temperature, in the molar ratio of $Na_2O:Al_2O_3$ (1.2–1.6), additive type and amount (i.e. glycerin, oleic acid, potassium oleate, Tween 80, lithium sulfate, lithium hydroxide, tartaric acid and derivatives thereof). Also varied was the amount and type of seed material.

Generally, either no seed, milled fine particles or aged gel particles of aluminum hydroxide were used, individually at from 0-10% by weight on $Al_2O_3$ basis. Gel aging refers to the process of transforming a gelatinous aluminum hydroxide to a micro crystalline form. The results show that glycerin, oleic acid and potassium oleate, Tween 80, lithium sulfate and lithium hydroxide produce essentially tabular or platelet shaped particles while tartaric acid and derivatives thereof will produce needle or rod shaped or fibrous products. Variations in the amount of additive did not affect the type of crystal obtained, but only influenced the size, shape factor and yield. Variations in the amount and/or types of seed have an effect on crystal size, shape factor and yield. The liquors also exhibited low sensitivity to variations in molar ratio. Therefore, by proper choice of additive type and amount, crystals of particular shapes can be obtained without concern about the sensitivity of the solution to variations in seed crystals or molar ratio. Thus, the process of the present invention is readily adaptable to industrial settings.

The data as a whole, that are listed in Table 1, illustrate how the product morphology of the aluminum hydroxide can be controlled within wide limits and to the desired extent by employing a particular molar ratio and a particular $Na_2O$ concentration of the sodium aluminate liquor during the crystallization process, by the nature and quantity of the additional ingredients added during the crystallization process, by the nature and amount of the seeding material and by the duration and temperature of the crystallization.

From the economic point of view, the specific crystalline product morphology aimed for must be defined by a special combination of the process parameters, in which the following are taken into consideration:

the additives used (type and quantity, availability, costs, possibility of recycling or the degree of recovery, possible use of additive combinations)

type, quantity and/or appropriateness of a seeding material molar ratio of the liquor (high molar ratios usually are uneconomic)

stirring conditions temperatures and times (times longer than 120 hours are uneconomic).

It must furthermore be taken into consideration that the effect, which controls the physical appearance, has a negative influence on the product yield, if the additives, especially complexing additives, exceed a maximum amount. Additives in the form of their salts and derivatives enable the crystallization to take place without a significant effect on the pH of the liquor.

The course of the crystallization is explained in greater detail by means of the outline shown in FIG. 1. Synthetic aluminate liquor 1 or Bayer liquor 2 is mixed with an additive 3 and optionally with a seeding material 4. The subsequent crystallization 5 takes place at a pH of more than 12 and at a temperature above 40° C., while the solution is being stirred or agitated. The molar ratio of $Na_2O : Al_2O_3$ in the sodium aluminate liquor is less than 1.8 during the crystallization process. Formation of special crystalline shapes takes place by adding to the sodium aluminate, up to 3% by weight of the solution of hydroxycarboxylic acid materials, such as tartaric acid or derivatives thereof. This results in the formation of needle shaped, rod-like gibbsite crystals having shape ratios of $\geq 5$. (See Table 1, experiments 38 through 48.)

There are other additives that may be used in the invention. A member of the group consisting of polyalcohols (aromatic and/or aliphatic alcohols containing at least 3 hydroxyl groups and/or phenols containing at least two hydroxyl groups) or fatty acids (which may be saturated or unsaturated and which contain at least 15 carbon atoms e.g. oleic acid) are added to the sodium aluminate liquor alone, or mixtures thereof in amounts up to 1% by weight of the sodium aluminate liquor. Another form of additive useful in the invention comprises compounds containing lithium ions. These may be added (in amounts ranging up to 1% by weight of the sodium aluminate liquor) to the sodium aluminate liquor alone or together with other members of the additive groups. Suitable lithium containing compounds for use as additives include lithium hydroxide, lithium sulfate and other lithium salts. These additives result in the formation of plate or tabular shaped gibbsite crystals having shape ratios of Z. (See Table 1, experiments 1-37.) After filtration 6 (preferably using a belt filter) and drying 7, the morphologically formed crystalline product of the invention can be drawn off.

For manufacturing by a continuous process, it is possible to react mother liquor 8 with fresh aluminum hydroxide 9 to form a sodium aluminate liquor of the desired starting concentration and to introduce it into the product line before the addition of one or more additives 3.

The process of the present invention is illustrated by the following examples.

EXAMPLE 1

In a 5 $m^3$ vessel, 27 kg of tartaric acid are dissolved in 3 $m^3$ of water and neutralized with 29 kg of a 50% sodium hydroxide solution. In a separate 5 $m^3$ vessel, 1.6 tons of sodium aluminate (dry product with 53% $Al_3O_3$ and 37% $Na_2O_{free}$; molar ratio of $Na_2O : Al_2O_3 = 1.15$) was dissolved with stirring in 3 $m^3$ water at a temperature of about 90° C. The two solutions were combined, filtered and transferred, with about 1.4 $m^3$ of hot water, to a heatable 10 $m^3$ stirred vessel. Subsequently, the $Al_2O_3$ content of the tartrate-containing sodium aluminate solution was adjusted to a value of approximately 150 g/L.

120 L of a seeding suspension was added to this solution, corresponding to an $Al_2O_3$ seed charge of 1.6% (the seed consisted of finest milled aluminum hydroxide with a $d_{50} < 3$ microns, in a total aluminum hydroxide equivalent of 13.5 kg $Al_2O_3$).

The starting volume of the suspension was approximately 5.5 $m^3$, with a tartrate concentration of approximately 0.5% by weight. At an average temperature of 87° C., approximately 490 kg of aluminum hydroxide (on dry basis) were precipitated from this suspension over the course of 43 hours. The product was filtered on a belt filter and dried. It had an average particle size of 15.4 microns ($d_{50}$). The dimensions of the individual crystals were: L (length)=5 microns, D (thickness) <1 micron. The shape ratio L/D accordingly had a value of $\geq 5$.

EXAMPLE 2

The procedure was similar to that of Example 1 with
(a) 55 kg glycerin (87%) in 3 $m^3$ water; additive amount added = about 0.7%
(b) 1.6 tons sodium aluminate in 3 $m^3$ water, cooled from 90° to about 75° C.

(c) dilution to liquor concentration of 150 g$Al_2O_3$/l with about 1.3 m³ water
(d) addition of 60 L seeding suspension (aluminum hydroxide equivalent of 6.7 Kg $Al_2O_3$ which is about a 0.8% seed charge)
(e) stirring and precipitating for 43 hours at an average temperature of 75° C.; yield of approximately 400 kg of product (on dry basis)
(f) filtration (belt filter), drying
(g) product: platelet-shaped crystallisate with $d_{50}=32$ microns; dimensions of the individual crystals: diameter=10 microns thickness≦1 micron shape factor≧10

The most important factor that affects crystal shape is the additive type as described previously. Other factors which influence crystal size and yield are: additive amount (large amount produce larger crystals and higher shape factors); seeding material (large amount leads to small crystals with small shape factors); temperature (a high temperature leads to large crystals with large shape factors); and, time (longer times lead to large crystal growth and maximum product yield). Of course, various factors can be adjusted to arrive at a particular product size and shape factor.

The examples in Table 2 show how the aluminum hydroxide crystals produced by the method of the present invention can be utilized as a filler, flame retardant and reinforcing agent.

properties of the plastic into which the filler material is incorporated.

For Table 2, mechanical values of extrudates of pure polyethylene, polypropylene and ABS thermoplastic materials (i.e. no fillers, flame retardants or reinforcing agents) are compared with the corresponding values of thermoplastics, which were filled with (a) aluminum hydroxides from conventional methods (Apyral 4, 40, 90[1]), numbers 1-3, 6-8, and 10-12

[1] Apyral 4: a relatively coarse aluminum hydroxide, produced from a Bayer hydroxide according to german Patent 2,852,273 by an etching method
Apyral 40 and 90: a fine-grained aluminum hydroxide produced from a standard Bayer aluminate liquor by means of a finely divided seeding material (b) products made according to the present invention, numbers 4, 5, 9, 13-18.

As a rule, a considerable impairment of the mechanical properties of the filled plastic must be expected when standard aluminum hydroxides are used at the high degrees of filling, which are required to impart adequate flame retardance to a plastic material. The comparison examples in Table 2 show how in accordance with the concepts of the mechanism of reinforcing effects by a filler, certain improvements in the strength values of the filled plastic can also be achieved with a standard aluminum hydroxide with particles of an increasing degree of fineness, as well as by optimizing the adhesive capability in a matrix (for example, by a surface treatment of the hydroxide), and that a signifi-

TABLE 2

Tensile Tests on Extrudates of Filled and Unfilled Thermoplasts
(Extrusion with Addition of 1% Lubricant; Extrudate Test Specimen Length/Diameter: 14/ca. 0.8 cm)

| No. | Aluminum Hydroxide Product Used | Aluminum Hydroxide Particle Size or Size of Primary Crystal [μm] | Degree of Filling [%] | Extrusion Temperature [°C.] | LOI Value [%] According to ASTM D2863 | Tensile Strength [N/mm²] | Change in Tensile Strength [%] | Remarks for Product Aluminumhydroxide |
|---|---|---|---|---|---|---|---|---|
|   | PE | — | 0 | 140 | 17,6 | 10,8 | — | — |
| 1 | Apyral 4 | $d_{50}$ = 7-10  K.ca. 3-25 | 65 | 140/150 | 25,1 | 4,2 | −61 |   |
| 2 | Apyral 40 | $d_{50}$ = 1,5-2,5  K.ca.0,5-5,5 | 65 | 140/150 | 28,9 | 9,2 | −15 |   |
| 3 | Apyral 90 | $d_{50}$ = 1,5-2  K.ca. 0,5-4 | 65 | 150 | 39.5 | 10,1 | −7 | Surface treat [0.6%] |
| 4 | G9387[1] | Kφ** 2,5;  Thickness φ 0,1 | 65 | 148 | 31.6 | 11,7 | +8 | Add: Glycerin |
| 5 | 226/1-3[2] | K.φ 50/70;  Thickness φ 7 | 65 | 140/150 | 30,8 | 12,0 | +11 | Add: Tartrat |
|   | PP | — | 0 | 190-210 | 17,6 | 21,5 | — | — |
| 6 | Apyral 4 | $d_{50}$ = 7-10  K.ca. 3-25 | 65 | 190-200 | 24,9 | 7,2 | −67 |   |
| 7 | Apyral 40 | $d_{50}$ = 1,5-2,5  K.ca. 0,5-5,5 | 65 | 190-200 | 26,8 | 6,9 | −68 |   |
| 8 | Apyral 90 | $d_{50}$ = 1,5-2  K.ca. 0,5-4 | 65 | 190-200 | n.b.* | n.b.* | n.b | Surface treat [0,6%] |
| 9 | Al/2[3] | K φ 0,5-2;  Thickness φ0,2-0,4 | 60 | "150" | 24.4 | 25.5 | +19 | Lithium aluminate |
|   | ABS | — | 0 | [195]160 | 17,7 | 6,3 | — |   |
| 10 | Apyral 4 | $d_{50}$ = 7-10  K.ca. 3-25 | 65 | 155 | 31,1 | 4,9 | −22 |   |
| 11 | Apyral 40 | $d_{50}$ = 1,5-2,5  K.ca. 0,5-5,5 | 65 | 155 | 33,9 | 7,3 | +16 |   |
| 12 | Apyral 90 | $d_{50}$ = 1,5-2  K.ca. 0,5-4 | 65 | 155 | n.b.* | n.b.* | n.b. | Surface treat [0.6%] |
| 13 | G31387a[4] | Kφ 3-5;  Thickness 0,2-0,3 | 65 | 155 | 34,1 | 7,0 | +15 | Add: oleic acid |
| 14 | G24287a[5] | Kφ 4;  Thickness φ 0,4 | 65 | 155 | 30,9 | 7,3 | +16 | Add: K-Na-Tartrat |
| 15 | G31387 | Kφ 1-5;  Thickness 0,2-0,3 | 65 | 155 | 33,2 | 7,6 | +21 | Add: oleic acid |
| 16 | Al/2 | Kφ 0,5-2;  Thickness 0,2-0,4 | 65 | 145 | 34,4 | 8,0 | +27 | Add.: Li Prod. |
| 17 | 226/1-3 | Kφ50-70;  Thickness φ 7 | 65 | 153 | 30,3 | 10,5 | +40 | Add.: Tartrat |
| 18 | G9387a | Kφ 2,5;  Thickness φ 0,1 | 65 | 155 | 34,0 | 10,9 | +73 | Add.: Glycerin |

*Extrudate not usable
**"Kφ" means average gain size measured as length or diameter
[1]corresponds to Table 1, Exp. 11
[2]corresponds to Exp. 30, except 10 g/l tartaric acid instead of Tween 80
[3]Exp. 34
[4]Exp. 15
[5]Exp. 41

Table 2 illustrates utilization of particular aluminum hydroxide particle sizes and crystals when used as fillers in polyethylene, polyproplyene and ABS plastic. Generally, the degree of filling remained essentially constant, yet the limiting oxygen index LOI value and tensile strength varied in relation to the type of crystal used. Thus, by controlling the aluminum hydroxide crystallization to produce crystals of particular forms and sizes, significant improvements can be made in the cant reinforcement was achieved only where hydroxide particles of the present invention, with their pronounced special morphological features, were used. This becomes clear especially considering the experimental examples with the ABS thermoplastic material.

Further application properties of the high surface area crystalline products of the invention, which are based on the special crystalline shape of such products, the mechanical stability of such particles which deviates from that of conventional aluminum hydroxides, the (in some cases) special degree of contamination and different thermal decomposition behavior (as far as the sintering behavior) of such particles, make them suitable for use in a matrix other than a plastic, i.e. they can be used in "polishing" pastes, toothpastes, paints and lacquers, in the manufacture of paper and in the area of ceramic raw materials. Thus, the material of the present invention is not limited to use as a filler in plastic material and the material may be used in other applications.

What is claimed is:

1. A method for the production of fillers and flame retardants composed of gibbsite, which comprises:
   providing a sodium aluminate liquor at a pH of more than 12 at a temperature above 40° C. and having a molar ratio of $Na_2O : Al_2O_3$ of $\leq 1.8$;
   adding no more than 3% by weight of a hydroxycarboxylic acid to the sodium aluminate liquor, to form needle-shaped, rod-like or fibrous gibbsite crystals with shape ratios of $\geq 5$; and
   recovering the gibbsite crystals.

2. A method for the production of fillers and flame retardants composed of gibbsite which comprises:
   providing a sodium aluminate liquor at a pH of more than 12 at a temperature above 40° C. and having a molar ratio of $Na_2O : Al_2O_3$ of $\leq 1.8$;
   adding no more than 1% by weight of an additive selected from the group consisting of polyalcohols, fatty acids and compounds with lithium ions to the sodium aluminate liquor, to form plate shaped or tabular gibbsite crystals with shape ratios of $\geq 5$; and
   recovering the gibbsite crystals.

3. The method of claim 1, wherein the $Na_2O : Al_2O_3$ ratio is maintained at $\leq 1.3$.

4. The method of claim 1, wherein the temperature is maintained between 70° and 125° C.

5. The method of claim 2 wherein the additives comprise polyalcohols selected from the group consisting of aliphatic and aromatic alcohols having at least 3 hydroxyl groups and phenols with at least two hydroxyl groups and mixtures thereof.

6. The method of claim 1, wherein said additive comprises a hydroxycarboxylic acid selected from the group consisting of aliphatic hydroxycarboxylic acids having at least 4 carbon atoms.

7. The method of claim 2, wherein said additives are selected from the group consisting of saturated and unsaturated fatty acids containing at least 15 carbon atoms.

8. The method of claim 2, wherein said additives comprise a derivative or salt form.

9. The method of claim 1 wherein said additive comprises a derivative or salt of a hydroxycarboxylic acid.

10. The method of claim 1, which comprises, after said adding, crystallizing for 48-120 hours while stirring said sodium aluminate liquor.

11. The method of claim 1 which further comprises, in conjunction with said hydroxycarboxylic acid adding step, adding aluminum hydroxide particles having an average particle diameter of $\leq 3$ microns to the sodium aluminate liquor during the crystallization step as a seed material, said particles added in amounts of 0.5-20% $Al_2O_3$, based on the initial $Al_2O_3$ content of the sodium aluminate liquor.

12. The method of claim 11 wherein the $Na_2O Al_2O_3$ molar ratio is maintained at $\leq 1.2$, and said seed material is added in amounts of 1-2% of the initial $Al_2O_3$ content of the sodium aluminate liquor.

13. The method of claim 11 wherein the $Na_2O : Al_2O_3$ molar ratio is maintained at $\geq 1.2$, and said seed material is used in amounts of 3-10% of the initial $Al_2O_3$ content of the sodium aluminate liquor.

14. The method of claim 11, wherein said seed material comprises aluminum hydroxide from a milling process or from a gel maturing process.

15. The method of claim 1, which comprises adding up to 3% by weight of said sodium aluminate liquor, tartrate or tartaric acid as the hydroxycarboxylic acid to produce needle-shaped, rod-like or fibrous aluminum hydroxide crystals, with an average particle length of 0.5 to 50 microns and an average particle diameter of 0.1 to 7 microns.

16. The method of claim 2, which comprises adding up to 1% by weight of an additive selected from the group consisting of glycerol, polyoxyethylene sorbitan mono-oleate, oleic acid, oleate and a lithium salt to said sodium aluminate liquor to form platelet-shaped or tabular aluminum hydroxide crystals with an average particle diameter of 0.5 to 70 microns and an average thickness of 0.1 to 3 microns.

17. Gibbsite having a needle-shaped, rod-like or fibrous structure with a shape ratio of $\geq 5$, a particle length of 0.5 to 100 microns and a particle diameter of 0.1 to 10 microns.

18. Gibbsite having a platelet-like to tabular structure with a shape ratio of $\geq 5$, a particle diameter of 0.5 to 100 microns and a particle thickness of 0.1 to 5 microns.

19. A thermoplastic material comprising at least about 60% of aluminum hydroxide, produced by the process which comprises:
   providing a sodium aluminate liquor at a pH of more than 12 at a temperature above 40° C. and having a molar ratio of $Na_2O : Al_2O_3$ of $\leq 1.8$;
   adding no more than 3% by weight of hydroxycarboxylic acid to the sodium aluminate liquor, to form needle-shaped, rod-like or fibrous gibbsite crystals with shape ratios of $\geq 5$; and
   recovering the gibbsite crystals.

20. A thermoplastic material comprising at least about 60% of aluminum hydroxide, produced by the process which comprises:
   providing a sodium aluminate liquor at a pH of more than 12 at a temperature above 40° C. and having a molar ratio of $Na_2O : Al_2O_3$ of $\leq 1.8$;
   adding no more than 1% by weight of an additive selected from the group consisting of polyalcohols, fatty acids and compounds with lithium ions to the sodium aluminate liquor, to form plate shaped or tabular gibbsite crystals with shape ratios of $\geq 5$; and
   recovering the gibbsite crystals.

* * * * *